United States Patent [19]

Kerlin, Jr.

[11] Patent Number: 4,777,368
[45] Date of Patent: Oct. 11, 1988

[54] APPARATUS AND METHOD FOR NONCONTACT MEASUREMENT OF THE VELOCITY OF A MOVING MASS

[75] Inventor: Thomas W. Kerlin, Jr., Knoxville, Tenn.

[73] Assignee: University of Tennessee, Knoxville, Tenn.

[21] Appl. No.: 901,892

[22] Filed: Oct. 11, 1988

[51] Int. Cl.[4] ............................ G01P 3/68; G01P 3/36
[52] U.S. Cl. ................................ 250/341; 250/359.1
[58] Field of Search ............... 250/354.1, 359.1, 358.1, 250/341

[56] References Cited

U.S. PATENT DOCUMENTS

| | | |
|---|---|---|
| 3,679,903 | 7/1972 | Blitchington, Jr. ............. 250/354.1 |
| 4,309,609 | 1/1982 | Sampson ............................ 250/341 |
| 4,335,616 | 6/1982 | Oliva .............................. 73/861.05 |
| 4,458,709 | 7/1984 | Springer ............................ 137/10 |
| 4,480,483 | 11/1984 | McShane ........................ 73/861.05 |
| 4,483,200 | 11/1984 | Togawa et al. ................. 73/861.05 |
| 4,502,339 | 3/1985 | Horn ............................... 73/861.05 |
| 4,510,390 | 4/1985 | Rajchman ........................... 250/341 |
| 4,532,811 | 8/1985 | Miller, Jr. et al. ............. 73/861.05 |
| 4,576,050 | 3/1986 | Lambert .......................... 73/861.05 |

Primary Examiner—Janice A. Howell
Assistant Examiner—Constantine Hannaher
Attorney, Agent, or Firm—Luedeka, Hodges & Neely

[57] ABSTRACT

The specification discloses an apparatus and method for measuring the velocity of a moving mass. A noncontact heat source, such as a high powered infrared laser, intermittently heats and creates a hot spot on the moving mass in a first position in space. The heat source remains out of contact with a moving mass while heating it. A noncontact detector, such as an infrared heat detector, detects the hot spot at a second position in space and remains spaced apart from second position while detecting the hot spot. The second position is spaced a predetermined distance from the first position and, with respect to the first position, is disposed in the direction of the travel of the moving mass. The noncontact detector generates a detection signal when the hot spot is in the second position, and a monitor is responsive to the detection signal to determine when the hot spot is in the second position. The monitor also determines when the hot spot is created at the first position and it generates a monitor signal corresponding to the time elapsed (transit time) while the moving mass traveled from the first position to the second position. Thus, the monitor signal corresponds to the velocity of the moving mass.

16 Claims, 3 Drawing Sheets

APPARATUS AND METHOD FOR NONCONTACT MEASUREMENT OF THE VELOCITY OF A MOVING MASS

FIELD OF INVENTION

The present invention relates to an apparatus and method for measuring velocity and particularly relates to an apparatus and method for measuring the velocity of a moving mass without contacting the mass.

BACKGROUND AND SUMMARY OF INVENTION

Velocity measurement of a moving masses is necessary for many industrial operations and in many applications noncontact velocity measurement is preferred or required. For example, a noncontact measurement is required where a contacting measurement device would interfere with the normal function or operation of the moving mass, where space on or around the mass is limited, or where the moving mass cannot accept any foreign objects. The present invention is an improved noncontact apparatus of method for measuring such velocity, and as used herein, the term "noncontact" is used to mean that there is no mechanical contact with the moving mass and no object or other material is attached to or introduced into the moving mass.

Many contact and noncontact methods of measuring the velocity of a moving mass are known. One of the most common types of velocity measurement involves the measurement of some property of a moving mass at two points along the direction of movement. For example, the reflective properties, the temperature or the density of the moving mass may be examined at two points to determine velocity. These methods usually depend on the existence of fluctuations in those properties (off average conditions) around their average values and the propagations of small volumes of these off average conditions for some distance along the direction of movement or flow. These off average conditions may be analyzed at two points to determine transit time. For example, in one such device two light sources and two light sensors are used to monitor a moving mass at two different points along the travel path of the moving mass. One source and sensor monitor reflective light from the mass at one point along the travel path and the other source and sensor monitor reflective light at another point which is down stream from the first point. Because of surface inhomogeneities, the reflected light will be different when reflected from different positions on the moving mass. However, since the two source and sensor pairs are monitoring the same moving mass, and assuming that surface conditions do not signficantly change between the first and second positions, the signals produced by each pair should be the same or similar, but time shifted one with respect to the other. The time shaft between these two signals is analyzed to determine the transit time between the two points and, thus, determine velocity.

In another method, a detectable object, such as a reflector, is placed on a moving object, usually a rotating object, and it is illuminated. The light reflected from the moving reflector is then analyzed to determine velocity.

In yet another velocity measurement technique that is commonly used to detect fluid flow velocity, a heater is placed into the flowing fluid and the heater is modulated so that the heat produced is changing over a period of time. A heat sensor is disposed in the fluid downstream from the heater to detect the heat fluctuations in the fluid and to produce a signal. The signal produced by the heat sensor will be time shifted with respect to the modulation of the heater, and this time shift may be analyzed to determine the transit time of the fluid between the heater and the sensor.

While known techniques for measuring velocity of moving masses have been adequate for many applications, the present invention generally offers significant advantages over such techniques and is more flexible in terms of the applications for which it is suited. For example, placing a temperature probe and a heater in a moving stream of fluid may cause turbulence or other undesirable disturbances in the fluid flow. These disturbances may create inaccuracies in flow measurement or have other undesirable consequences unrelated to velocity measurement. The present invention avoids creating such disturbances by not contacting the moving mass. Also, in most cases, it would not be practical to insert heaters and heat sensors in a flow of solid objects or a slurry flow. The sensors would impede the movement or flow of the objects, and the solid objects may destroy the heaters and sensors. Likewise, these problems are overcome in the present invention because it does not require any type of contact with the moving mass.

The reflected light technique described above depends on the reflective characteristic of the moving mass which usually means that it depends on the surface characteristics thereof. In some situations the surface characteristics are changing very rapidly, and if these changes are sufficient, it may be impossible to correlate signals generated by reflections from the moving mass at two points along the travel path. Since the present invention does not rely on surface characteristics, this problem is avoided.

In accordance with the present invention, an apparatus for measuring the velocity of a moving mass having a direction of travel includes a noncontact heat source. The heat source intermittently heats and creates a hot spot on the moving mass at a first position in space, and during the heating operation, the heat source remains out of contact with the moving mass. A noncontact detector is also provided for detecting heat at a second position in space, and during the detection operation, the detector remains spaced apart from the second position. The second position is spaced a predetermined distance apart from the first position and, with respect to the first position, the second position is disposed in the direction of travel of the moving mass. As the mass passed by, the detector is operable to detect and generate a detection signal when the hot spot is in the second position. A monitor system is provided for monitoring when a hot spot is created on the moving mass in the first position and for monitoring the detection signal to determine when the hot spot is in the second position. The monitor system then generates a monitor signal that corresponds to the time elapsed while the hot spot on the moving mass travels from the first position to the second position, and, thus, corresponds to the velocity of the moving mass.

In the preferred form, the noncontact heat source is an infrared light source and the noncontact heat detector is an infrared heat detector. Also, in order to improve reliability, a band pass filter is used to condition the detection signal. Background light and heat sources will be detected by the detector and in response to this background noise, a low frequency signal will be generated. In contrast, the hot spot on the moving mass when detected by the detector, will cause a sudden jump in the detection signal and will have a high frequency. The band pass filter is chose to pass the relatively high frequency signals created when the hot spot enters the second position and to reject the relatively low frequency signal created by background noise.

In accordance with another aspect of the preferred form of the present invention, the velocity of the moving object is determined by looking at several transit times of several hot spots moving from the first to the second positions. This plurality of transit times is processed using a cross correlation function to calculate the velocity of the moving mass.

In accordance with yet another aspect of the preferred form of the present invention, a second infrared light detector may be used to determine when the heat source is creating a hot spot. This infrared light detector would simply monitor the output of the infrared heat source and would provide a signal as part of the monitor system to indicate when the hot spot is being created. Alternatively, the monitor system could simply monitor the power to the radiant heat source and use the power signal to determine when the heat source is creating the hot spot.

In the preferred form of the present invention, the detector includes a micrometer mounting system for adjusting the position of the detector so that the distance between the heat source and the detector may be precisely maintained. An electronic caliper is provided to constantly monitor the position of the heat detector and provides such position information back to the monitor system. Finally, as an aid to the positioning of the heat detector, an aiming light is mounted on the heat detector to transmit a beam of light to indicate the path and position that will be detected by the heat detector.

In addition to the apparatus described above, the invention encompasses the methods that are performed by the above described apparatus for measuring the velocity of a moving mass.

BRIEF DESCRIPTION OF THE DRAWINGS

The present invention may best be understood by reference to the following detailed description of preferred embodiments of the present invention when considered in conjunction with the Drawings in which:

FIGS. 5a and 5b illustrate typical filtered signals from the light monitor and infrared heat detector;

FIGS. 6a and 6b illustrate trigger signal generation based on the light monitor signal and the infrared detector signal;

FIGS. 7a and 7b illustrate typical filtered signals from the light monitor and the infrared detector for multiple episodes; and FIG. 8 illustrates a typical cross correlation function between the light signal and the infrared detector signal based on multiple episodes.

DETAILED DESCRIPTION

Figure 1:
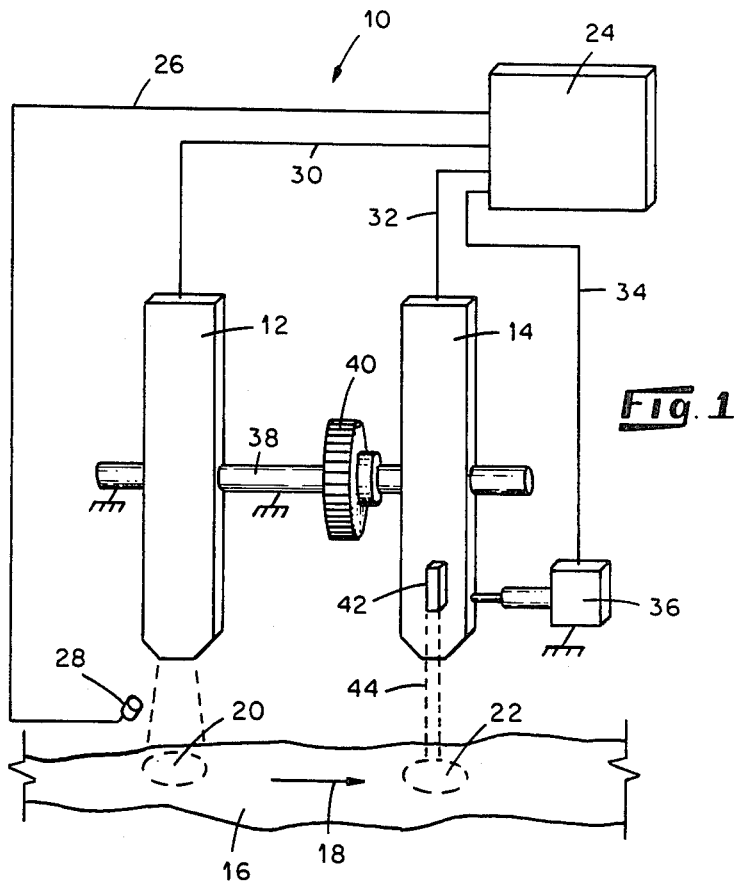
FIG. 1 is a schematic diagram of a noncontact velocity measurement apparatus showing a moving object, a heat source and a heat detector.

Referring now to the drawings in which like reference characters designate like or corresponding parts throughout the several views, there is shown in FIG. 1 a noncontact velocity measurement apparatus 10 that includes an heat source 12 and heat detector 14. In its preferred form, the infrared heat source 12 is a high intensity carbon dioxide laser that focuses its beam toward a moving mass 16 that is moving along a travel path indicated by the arrow 18. Although the mass 16 is depicted in FIG. 1 as a solid object, it will be understood that the invention may be used with many different types of moving masses, including fluid, suspensions, slurries, and the like, but the present invention is best suited for use with moving solid objects. The heat source 12 focuses its beam on the moving mass 16 to create a hot spot 20 thereon, and the hot spot will move with the moving mass 16 in the direction indicated by the arrow 18. In FIG. 1, a second hot spot 22 is shown in position beneath the detector 14. This hot spot 22 was previously created by heat source 12 and has moved to the position indicated by hot spot 22 for detection. The distance between the heat source 12 and the detector 14 is chosen so that the hot spot 22 will be substantially similar to the hot spot 20. That is, taking into consideration the conductive properties of the moving mass 16, the expected heat transferred due to convection and radiation, and the speed of the moving mass 16, the hot spot 22 will remain relatively unchanged as it moves from adjacent the heat source 12 to a position adjacent to the detector 14. One concept basic to the present invention is that the time of the creation of the hot spot 20 by the source 12 will be monitored, as will the time of detection of the same hot spot by the detector 14, and the transit time of the hot spot 20 traveling from the source 12 to the detector 14 will be calculated. This transit time will indicate the velocity of the moving mass 16.

The monitoring function is provided by the processor 24 which also functions as a power supply. The processor 24 is connected by line 26 to a light detector 28 that is focused on the output of the heat source 12. The function of the light detector 28 is to create a signal indicating that the heat source 12 is on and is creating a hot spot, and this information is fed back to the processor 24. Line 30 represents the interconnection between processor 24 and heat source 12 through which data is transferred and power is supplied to the heat source 12. (The term "line" as used herein and shown in the drawings may represent more than one interconnection even though shown or referred to as single). In an alternate embodiment, line 30 could be monitored to determine power "on" and power "off" conditions and, thus, to indirectly determine when the heat source 12 is creating a hot spot 20 of the mass 16. In either case, the processor 24 is continuously updated as to the time of creation of each hot spot 20 by the source 12.

A line 32 reprsents the connection from the processor 24 to the detector 14 for supplying power to the detector 14 and for feeding a detection signal from the detector 14 back to the processor 24. This detection signal corresponds to the heat detected by the infrared heat detector 14 and, thus, would include signals indicating the presence or absence of a hot spot 22 in a detection position adjacent to the detector 14. In this manner, the processor 24 is continuously provided with information as to when the hot spots 22 are detected.

Line 34 connects the processor 24 to a linear position monitor referred to herein as a caliper 36 that is mechanically interconnected with the detector 14 to continuously provide position data to the processor 24. In the preferred embodiment, both the heat source 12 and the detector 14 are mounted on a mounting rod 38 that will control the distance between them. A micrometer 40 is connected to the mounting rod 38 and to the detector 14 so that by adjusting the micrometer 40, the relative positions of, and the distance between, the source 12 and the detector 14 may be precisely controlled. As the micrometer 40 is adjusted to move the detector 14, the amount of movement of the detector 14 and the new position of the detector 14 is provided to the processor 24 by data from the electronic caliper 36. Thus, the processor 24 is continuously provided with the precise distance between the source 12 and the detector 14.

In order to facilitate the positioning of the detector 14, it includes an aiming light 42 mounted thereon to direct a beam 44 along the detection direction. The detector 14 is designed so that it will detect infrared radiation emanating from a specific position. Thus, it will detect infrared radiation traveling up the path indicated by the beam 44. In order to properly position the detector 14, it is moved so that the beam 44 will illuminate the expected position of hot spots 22 that are initially created by the source 12.

Figure 2:
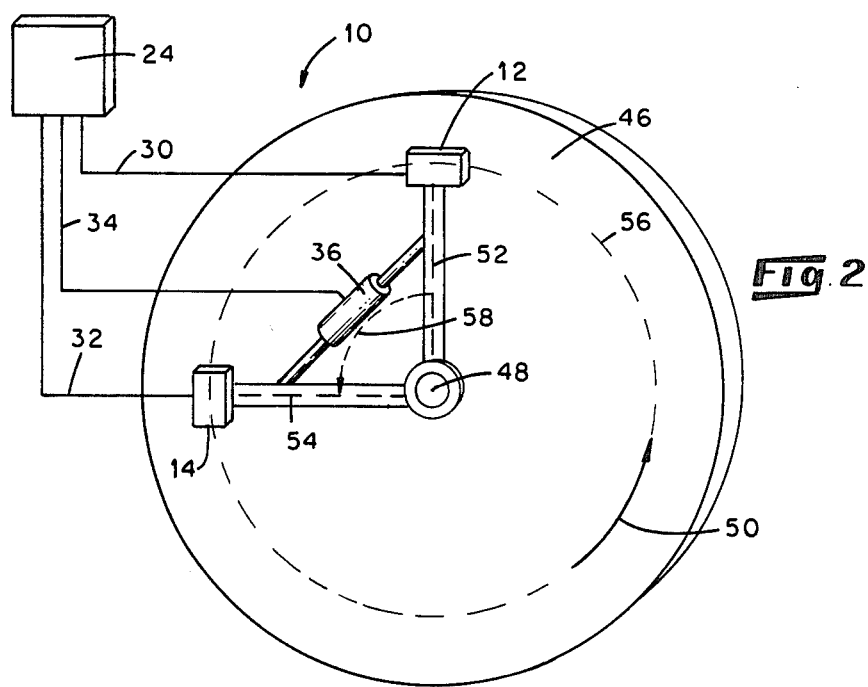
FIG. 2 is schematic diagram of a noncontact velocity measurement apparatus configured to measure the rotational velocity of a rotating object.

Referring now to FIG. 2, there is shown an alternate embodiment of the invention in which the noncontact velocity measurement system 10 is modified and mounted to detect the angular velocity of a rotating object 46 that is rotating about an axis of rotation 48 in the direction indicated by the arrow 50. In this embodiment, the source 12 and the detector 14 are mounted equidistantly from the axis of rotation 48 by arms 52 and 54, respectively. Thus, the detector 14 and the source 12 are positioned on the same circular path of rotation as indicated by the dotted circle 56. A hog spot created by the source 12 will travel along the circular travel path 56 past and adjacent to the detector 14.

In this embodiment, the caliper 36 is pivotally connected at two ends to the arms 52 and 54 so that it will measure a linear distance between the arms 52 and 54 and it is calibrated so that the output of the caliper 36 corresponds to the angular distance, as indicated by arrow 58, between the two arms 52 and 54. Thus, the output of the caliper 36 will provide to the processor 24 the angular distance between the source 12 and detector 14. The transit time of a hot spot as it travels from the source 12 to the detector 14 is determined as described above with respect to the embodiment shown in FIG. 1, and using this transit time information and the angular distance 58, the processor 24 calculates the angular velocity of the rotating object 46.

Figure 3:
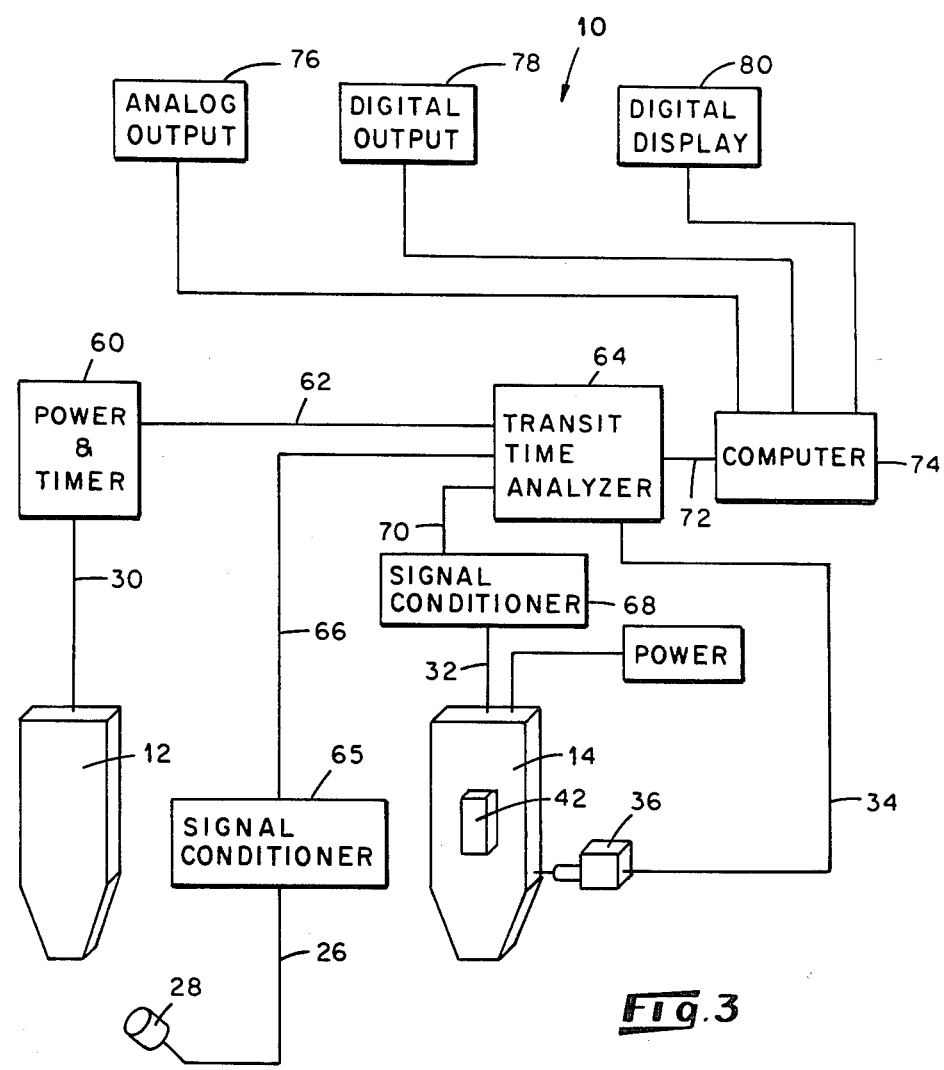
FIG. 3 is a block diagram of the noncontact velocity measurement apparatus illustrating its electronic operation.

Referring now to FIG. 3, there is shown a block diagram of the velocity measurement system 10 which graphically illustrates the electronic operation of this system. The heat source 12 is connected by line 30 to a power supply and timer 60 that includes an internal clock that intermittently powers the heat source 12 on and off. A control line 62 is connected between the power and timer 60 and a transit time analyzer 64. Control signals are transmitted to the power and timer 60 over a line 62 and trigger signals are supplied by the power and timer 60 over the line 62 back to the transit time analyzer 64 so that the analyzer 64 can indirectly determine when the heat source 12 is turned on.

The light sensor 28, which senses the output of the heat source, is connected by line 26 to a signal conditioner 65 and the output signal conditioner 65 is provided on line 66 to the transit time analyzer 64. In the preferred mode, the signal conditioner 65 is a band pass filter that passes high frequencies and rejects low frequencies. Background noise and ambient light will represent relatively low frequencies and, when the heat source 12 turns on, the abrupt change in light detected by the sensors 28 will represent a high frequency that will be passed by the signal conditioner 65 to the transit time analyzer 64 indicating that the heat source 12 turned on. Likewise, when the heat source 12 turns off, the abrupt change will represent a high frequency signal that will be passed to the analyzer 64 indicating that the source 12 is "off."

In like manner, the detection signal from the detector 14 is transmitted by line 32 to a signal conditioner 68 whose output is supplied on line 70 to the transit time analyzer 64. The signal conditioner 68 is also preferably a band pass filter that passes high frequency signals and rejects low frequency signals. When the hot spot moves into detection position, such as hot spot 22 shown in FIG. 1, it will create an abrupt change in the output of the detector 14 representing a high frequency signal and when the hot spot moves out of detection position, another abrupt change in the output of the detector 14 will represent another high frequency signal. These two high frequency signals are passed by the signal conditioner 68 to the transit time analyzer 64 indicating when the hot spot appeared at the detection position and when it left the detection position. Again, the relatively low frequencies produced by ambient light and heat and background noise will be rejected by the signal conditioner 68. The transit time analyzer is also supplied with distance information as to the distance between the source 12 and the detector 14 by the caliper 36 through line 34. Thus, the transit time analyzer is supplied with the time at which the source 12 is turned on, the time at which the hot spot appears at the detector 14, and the distance between the source 12 and the detector 14. Using this information, the transit time analyzer calculates the velocity of the moving mass 16 and supplies that information on line 72 to the computer 74. The computer 74 can store the information, or output it in a number of forms. In the preferred form, the computer 74 will transmit the raw data obtained by the transit time analyzer 64 through an analog output 76. It will also convert the data to a digital form and transmit it to a digital output 78 and, after calculating the velocity of the moving mass, it will transmit that data to a digital display 80 and cause it to be visually displayed.

Figure 4A:
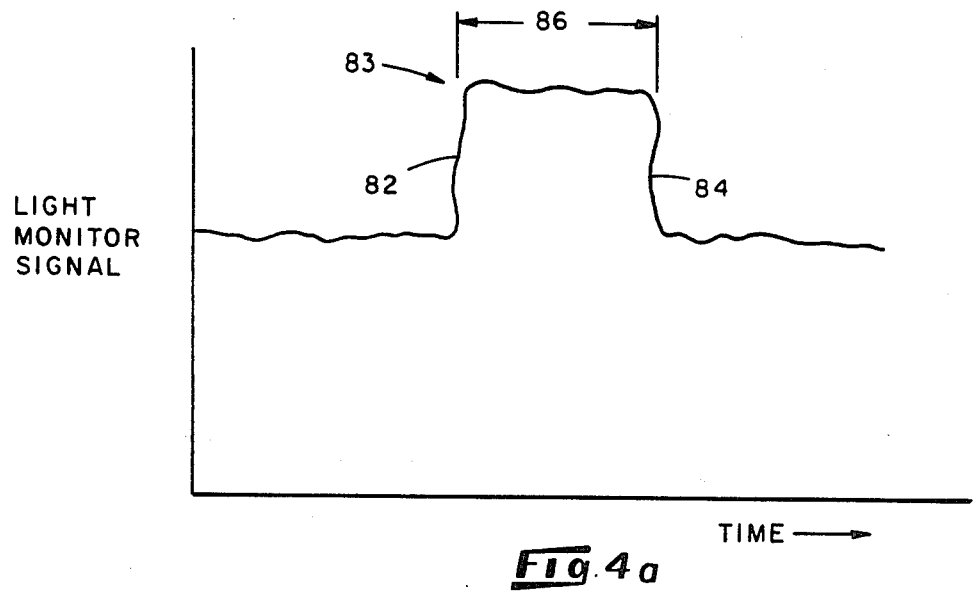
FIGS. 4a and 4b graphically illustrate typical signals from a light monitor which monitors an infrared heat source and from an infrared detector.
Figure 4B:
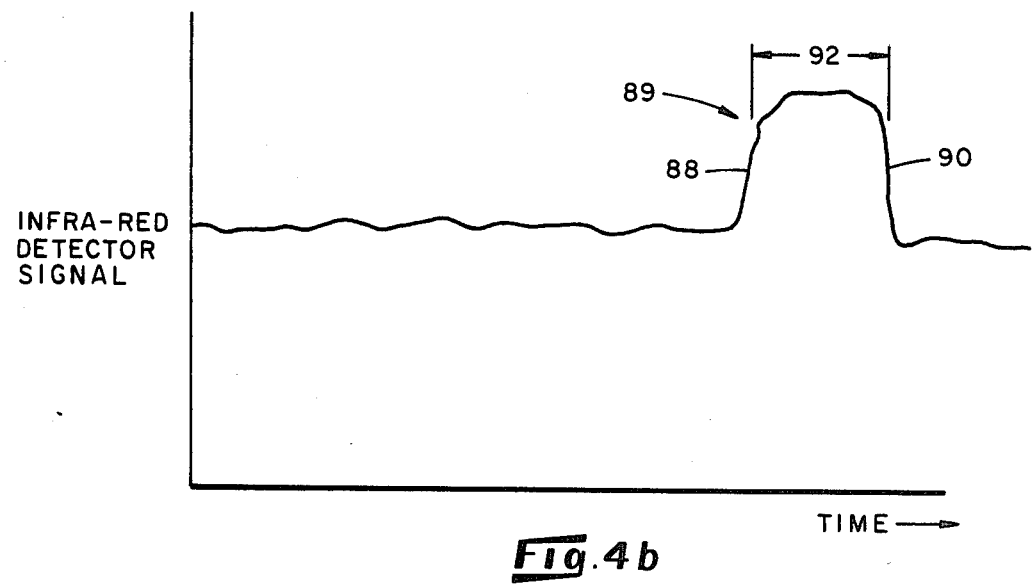

Referring now to FIGS. 4a and 4b, there are shown typical signals from the light monitor 28 (FIG. 4a) and the infrared detector 14 (FIG. 4b). In these Figures, the horizontal axis indicates time and the vertical axis indicates the amplitude of the signals. In FIG. 4a, the leading edge 82 of the square wave 83 indicates the time at which the source 12 was powered on; the trailing edge 84 indicates the time at which the source 12 was powered "off" and the width 86 of the square wave 83 indicates the time during which the source 12 remained on. Likewise, in FIG. 4b, the leading edge 88 of the square wave indicates when the detector 14 first detected the hot spot 22; the trailing edge 90 indicates when the hot spot 22 moved out of detection position adjacent the detector 14, and the distance 92 represents the time during which the hot spot was being detected by the detector 14. Referring to both FIGS. 4a and 4b, it will be appreciated that the signal from the infrared detector 14 (square wave 83) is time shifted with respect to the signal from the light monitor 28 (square wave 89). This time shift indicates the time that was required for the hot spot to travel from the heat source 12 to the detector 14.

FIG. 5 graphically illustrates the typical filtered signals from the light monitor 28 and the infrared detector 14. FIG. 5a shows the light monitor 28 signals as they would appear after passing through the signal conditioner 65 and FIG. 5b shows the detector 14 signal after it has passed through the signal conditioner 68. Referring to FIG. 5a, the spike 94 represents the high frequency signal corresponding to the leading edge 82 and the spike 96 represents the high frequency signal corresponding to the trailing edge 84 as shown in FIG. 4a.

Likewise, with regard to the signal from the infrared detector 14, FIG. 5b shows a spike in 98 that corresponds to the high frequency signal is created by the leading edge 88 and (FIG. 4b) the spike 100 represents the high frequency signal created by the trailing edge 90 (FIG. 4b). The spikes 94-100 may be used to calculate the transit time of the hot spot as it moves from the radiant heat source 12 to the detector 14.

As shown in FIGS. 6a and 6b, it is preferred to use the spikes 94 and 98 to determine transit time. In order to determine when the heat source 12 turns on, a trigger level 102 is chosen so that whenever the spike 94 appears, a starting time t1 as indicated by the dashed line 104 wil be determined.

In like manner, at arbitrary trigger level 106 is chosen for analyzing the conditioned signal from the detector 14. Whenever the spike 98 appears, it will exceed the trigger level 106 and a time t2 as indicated by a dashed line 108 will be established indicating the moment at which the hot spot was first detected by the detector 14. The difference betewen t1 and t2 will be the transit time of the hot spot as it travels from the heat source 12 to the detector 14.

It will be appreciated that the spikes 96 and 100 could also be used to determine the transit time, or the transit time could be determined using a combination of the spikes 94, 96, 98, and 100 using an averaging or correlation technique. In most applications, it will be preferable to monitor a plurality of episodes in order to determine the velocity of the moving mass 16.

FIGS. 7a and 7b show, respectively, the conditioned signals that would be produced by the light monitor 28 and the detector 14 for three episodes or cycles.

Perhaps the most accurate way to determine transit time would be to determine a cross correlation between the light monitor 28 signal and the detector 14 signal as shown in FIGS. 7a and 7b, respectively. FIG. 8 illustrates a typical cross correlation function between the light monitor 28 signal and the detector 14 signal. In this Figure, the vertical axis represents correlation between the two signals and the horizontal axis represents time. The peak of the pulse 110 occurs at the time t1 which corresponds to the transit time of the hot spot as it moves from the heat source 12 to the detector 14.

As previously mentioned, the velocity of the moving mass 16 could be determined with a single heat/detect episode as shown in FIG. 5, but multiple episodes will normaly be used and averaging could be used to improve accuracy. However, even when averaging is performed, there will be some uncertainty in the velocity measurement because the selection of the trigger levels 102 and 106 (FIG. 5) cannot be made perfectly. To overcome this problem, it is preferred to use more advanced signal processing methods such as cross correlation. The cross correlation $C_{12}(t)$ function is given by:

$$C_{12}(T) = \int_0^P x(t)y(t-T)dt$$

where $C_{12}(T)$ = cross correction function
$T$ = lag time
$P$ = analysis time
$x,y$ = signals
$t$ = time Using this cross correlation function, the transit time may be determined as graphically illustrated in FIG. 8.

Although described above with respect to particular embodiments, it will be understood that the invention is capable of numerous rearrangements, modifications or substitutions of parts without departing from the scope of the invention. The above detailed description is not intended as a limitation on the scope of the invention.

What is claimed is:

1. An apparatus for measuring the velocity of a moving mass having a direction of travel, comprising:

noncontact heat source means for intermittently heating and creating a hot spot in the moving mass at a first position in space, said noncontact heat source means remaining out of contact with the moving mass when heating the mass;

noncontact detector means for detecting heat in the moving mass at a second position in space and remaining spaced apart from the second position in space when detecting, said second position being spaced a predetermined distance apart from said first position and, with respect to said first position, being disposed in the direction of travel of the moving mass;

said noncontact detector means being operable to detect the presence of the hot spot in the moving mass when the hot spot reaches the second position and to generate a detection signal when the arrival of the hot spot at the second position is detected; and monitor means for monitoring the time at which a hot spot is created on the moving mass in the first position, for monitoring the time at which the detection signal indicates that the hot spot has reached the second position, and for generating a monitor signal corresponding to the time elapsed during movement of the hot spot from the first position to the second position to enable a determination of the velocity of the moving mass.

2. The apparatus of claim 1 wherein:

said noncontact heat source is an infrared light source; and said noncontact detector is an infrared heat detector.

3. The apparatus of claim 1 wherein:

said noncontact heat source is an infrared light source;

said noncontact detector is an infrared detector; and said moving mass is a solid object.

4. The apparatus of claim 1 further comprising a band pass filter for receiving and filtering the detection signal for passing relatively high frequency signals created by the presence of the hot spot at the second position and for rejecting relatively low frequency signals created by ambient light conditions.

5. An apparatus for detecting the velocity of a moving solid object having a travel path and a travel direction, comprising:

a radiant heat source disposed adjacent to, but spaced apart from, the travel path for intermittently heating and creating a hot spot on the solid object;

means for detecting the time at which the radiant heat source creates the hot spot on the object and for generating an on signal corresponding to the time at which the hot spot is created;

a radiant heat detector disposed adjacent to, but laterally spaced apart from, the travel path and being positioned down stream in the travel direction from said radiant heat source, said radiant heat detector being configured to detect the heat on the solid object in the path of movement of the hot spot and to generate a detection signal corresponding to the magnitude of the heat detected on the solid object;

means for mounting said radiant heat detector at a predetermined distance from said said radiant heat source;

detection circuitry connected to receive the detection signal and being configured to analyze the detection signal to determine the presence of the hot spot in the travel path adjacent to the detector based on a predetermined change in the detection signal and to generate a presence signal corresponding to the time that the presence of the hot spot is determined; and velocity calculation means responsive to the on signal and the presence signal for determining the elapsed time between the on and presence signals and for calculating the velocity of the object based on the elapsed time and the predetermined distance between said heat detector and heat source, and for generating a velocity signal corresponding to said velocity.

6. The apparatus of claim 5 further comprising output means responsive to the velocity signal for outputting the velocity of the moving object.

7. The apparatus of claim 5 wherein said detection circuitry further comprises band filters for rejecting relatively low frequency signals and thus discriminating against background light and passing relatively high frequency signals generated by the presence of the hot spot adjacent to said radiant heat detector.

8. The apparatus of claim 5 wherein said means for mounting further comprises:

means for adjusting said predetermined distance; and means for inputting said adjusted predetermined distance to said velocity calculation means.

9. The apparatus of claim 8 wherein said means for adjusting further comprises a micrometer attached to said radiant heat detector.

10. The apparatus of claim 5 further comprising an aiming light mounted on said radiant heat detector to illuminate the location in the travel path which is sensed by the heat detector.

11. The apparatus of claim 5 wherein said velocity means further comprises cross correlation calculation means for processing a plurality of on signals and presence signals using a cross correlation function to calculate the velocity of the object.

12. The apparatus of claim 5 wherein said means for detecting comprises a second radiant heat detector configured to detect when the radiant heat source is heating.

13. The apparatus of claim 5 wherein said means for detecting comprises means connected to said radiant heat source for determining when said radiant heat source is receiving power.

14. An apparatus for detecting the angular velocity of a rotating solid object comprising:

a radiant heat source disposed adjacent to, but spaced apart from, the rotating solid object for intermittently heating and creating a hot spot on the solid object, said hot spot traveling in a circular travel path;

means for detecting the time at which said radiant heat source creates the hot spot on the rotating solid object and for generating an on signal corresponding to the time at which the hot spot is created;

a radiant heat detector disposed adjacent to, but laterally spaced apart from, the rotating solid object and being positioned adjacent to the circular travel path and downstream from said radiant heat source, said detector being configured to detect the heat on the solid object in the path of movement of the hot spot and to generate a detection signal corresponding the magnitude of the heat detected on the solid object;

means for mounting said radiant heat detector at a predetermined angular distance along said circular travel path from said radiant heat source;

detection circuitry connected to receive the detection signal and being configured to analyze the detection signal to determine the presence of the hot spot in the circular travel path adjacent to the detector based on a predetermined change in the detection signal and to generate a presence signal corresponding to the time that the presence of the hot spot is determined; and velocity calculation means responsive to the on signal and to the presence signal for determining the elapsed time between the on and presence signals of the hot spot as it passes from the radiant heat source to the radiant heat detector and for generating an angular velocity signal based on the elapsed time and the predetermined distance between said heat detector and heat source corresponding to the angular velocity of the rotating solid object.

15. A method for measuring the velocity of a moving mass having a direction of travel, comprising:

intermittently heating and creating a hot spot in the moving mass at a first position in space without contacting the moving mass when heating;

detecting heat in the moving mass at a second position in space that is a predetermined distance apart from said first position and, with respect to said first position, said second position in space being disposed in the direction of travel of the moving mass and in the path of movement of the hot spot so that arrival of the hot spot of the second position is detected;

generating a detection signal at the time the arrival of the hot spot at the second position is detected;

monitoring the time at which the hot spot is created in the moving mass at the first position;

monitoring the time at which the detection signal is generated; and generating a monitor signal which corresponds to the time elapsed between the time at which the hot spot is created and the time at which the hot spot arrives at the second position to facilitate a determination of the velocity of the moving mass.

16. A method for detecting the velocity of a moving solid object having a travel path and a travel direction, comprising;

intermittently heating and creating a hot spot on the moving solid object with a beam of radiant heat;

detecting creation of the hot spot on the solid object and generating an on signal to indicate the time at which creation of the hot spot is detected;

detecting heat on the solid object in the travel path of the hot spot downstream in the travel direction at a predetermined distance from the point at which the hot spot was created;

generating a detection signal corresponding to the magnitude of the heat detected on the solid object;

analyzing the detection signal to determine the presence of the hot spot based on a predetermined change in the detection signal, and generating a presence signal to indicate the time of said pesence; and determining time elapsed between the time at which creation of said hot spot is detected and the time at which the presence of said hot spot at said detection location is determined and calculating the velocity of the moving object based on the elapsed time and the predetermined distance.

* * * * *

UNITED STATES PATENT AND TRADEMARK OFFICE
CERTIFICATE OF CORRECTION

PATENT NO. : 4,777,368

DATED : October 11, 1988

INVENTOR(S) : Thomas W. Kerlin, Jr.

It is certified that error appears in the above-identified patent and that said Letters Patent is hereby corrected as shown below:

On the title page,
Filing Date should be --August 28, 1986--,

Column 1, line 57 delete "shaft" and insert --shift--,

Column 2, line 53 delete "passed" and insert --passes--,

Column 3, line 6 delete "chose" and insert --chosen--,

Column 4, line 62 delete "reprsents" and insert --represents--,

Column 5, line 41 delete "hog" and insert --hot--,

Column 6, line 40 after "analyzer" insert --64--,

Column 8, line 15, delete "correction" and insert --correlation--,

Column 9, line 27, after "said" delete --said--,

Column 12, line 11 after "determining" insert --the--.

Signed and Sealed this

Twenty-eighth Day of February, 1989

Attest:

DONALD J. QUIGG

*Attesting Officer*  *Commissioner of Patents and Trademarks*